US007284075B2

(12) United States Patent
Eldar et al.

(10) Patent No.: US 7,284,075 B2
(45) Date of Patent: Oct. 16, 2007

(54) INBOUND PACKET PLACEMENT IN HOST MEMORY

(75) Inventors: Avigdor Eldar, Jerusalem (IL); Trumper Fabian, Modin (IL)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 10/806,507

(22) Filed: Mar. 23, 2004

(65) Prior Publication Data

US 2005/0216616 A1     Sep. 29, 2005

(51) Int. Cl.
*G06F 13/12* (2006.01)

(52) U.S. Cl. .......................................... 710/52; 710/57

(58) Field of Classification Search ...................... None
See application file for complete search history.

(56) References Cited

U.S. PATENT DOCUMENTS

| | | | | |
|---|---|---|---|---|
| 5,751,951 | A * | 5/1998 | Osborne et al. | 709/250 |
| 6,067,300 | A * | 5/2000 | Baumert et al. | 370/413 |
| 6,105,024 | A * | 8/2000 | Graefe et al. | 707/7 |
| 6,151,644 | A * | 11/2000 | Wu | 710/52 |
| 6,724,767 | B1 * | 4/2004 | Chong et al. | 370/412 |
| 2005/0135356 | A1 * | 6/2005 | Muthukrishnan et al. | 370/389 |

OTHER PUBLICATIONS

Braden, R. (Ed.), "Requirements for Internet Hosts- Communication Layers", *Network Working Group*, RFC 1122, Oct. 1989, pp. 1-116.

Foong, A.P., T.R. Huff, H.H. Hum, J.P. Patwardhan, & G.J. Regnier, "TCP Performance Re-Visited", Proceedings of the International Symposium on Performance Analysis of Systems and Software (ISPASS), Mar. 2003.
IEEE, Inc., "IEEE Std. 802.3", Section One, 2002, pp. i-xxiii, 1-32 & 83-99 (Chs. 1 & 5).
Intel Corporation, "IA-32 Intel Architecture Software Developer's Manual", vol. 3: System Programming Guide, Order No. 253668-016, Jun. 2005, pp. i-xxvii, 2-1-2-30, 3-1-3-48, 10-1-10-44 (Chs. 2, 3, & 10).
Intel Corporation,"Intel Itanium 2 Processor Reference Manual For Software Development and Optimization", Order No. 251110-003, May 2004, pp. 1-12, 17-24, & 45-62 (Chs. 2 & 6).
Socolofsky, T. & C. Kale, "A TCP/IP Tutorial", *Network Working Group*, RCF 1180, Jan. 1991, pp. 1-28.

* cited by examiner

*Primary Examiner*—Donald Sparks
*Assistant Examiner*—David E. Martinez
(74) *Attorney, Agent, or Firm*—Konrad Raynes & Victor LLP; David W. Victor (57) ABSTRACT

Provided is a method, system, and article of manufacture for inbound packet placement in host memory. A first packet for a buffer in memory is received and a descriptor is generated indicating a length of the first packet and a buffer address of the buffer. At least one subsequent packet following the first packet capable of fitting in the buffer with the first packet is received and a descriptor is generated for each received subsequent packet. The first packet and the at least one subsequent packet capable of fitting into the buffer are transferred to the buffer. The descriptors of the first packet and the at least one subsequent packet written to the buffer are added to a descriptor array.

29 Claims, 4 Drawing Sheets

INBOUND PACKET PLACEMENT IN HOST MEMORY

BACKGROUND

Adapters that transmit data over a network using the Transmission Control Protocol (TCP)/Internet Protocol (IP) communication protocol write the packets to host memory where the packets are processed by a host system software driver. Adapters using network communication protocols other than TCP/IP may also copy inbound traffic to the host memory. Further details of the TCP/IP protocol are described in the publications "A TCP/IP Tutorial", Request for Comment No. 1180, published by the Internet Engineering Task Force (IETF) (January 1991) and "Requirements for Internet Hosts—Communication Layers", RFC No. 1122, published by the IETF (October 1989). Network adapters may also transmit packets using additional protocols known in the art, such as Layer 2 packets, like Ethernet & Token Ring, which encompass TCP packets. Layer II protocols are defined in IEEE 802.3, 802.5, 802.11, 802.14 Specifications. When writing the packets, the adapter places information on a packet to write to host memory in a descriptor data structure that references a host memory buffer of a fixed byte size, such as 1514 bytes, in which one packet is placed. Each received packet is written to one or more buffers in memory that is referenced by a separate descriptor. The adapter adds an updated descriptor including information on the packet in the memory buffer referenced by the descriptor to a descriptor table or array that the host software driver uses to access the packets. When the packet is in memory, the adapter hardware signals the software driver that a packet is available in memory and ready to process.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
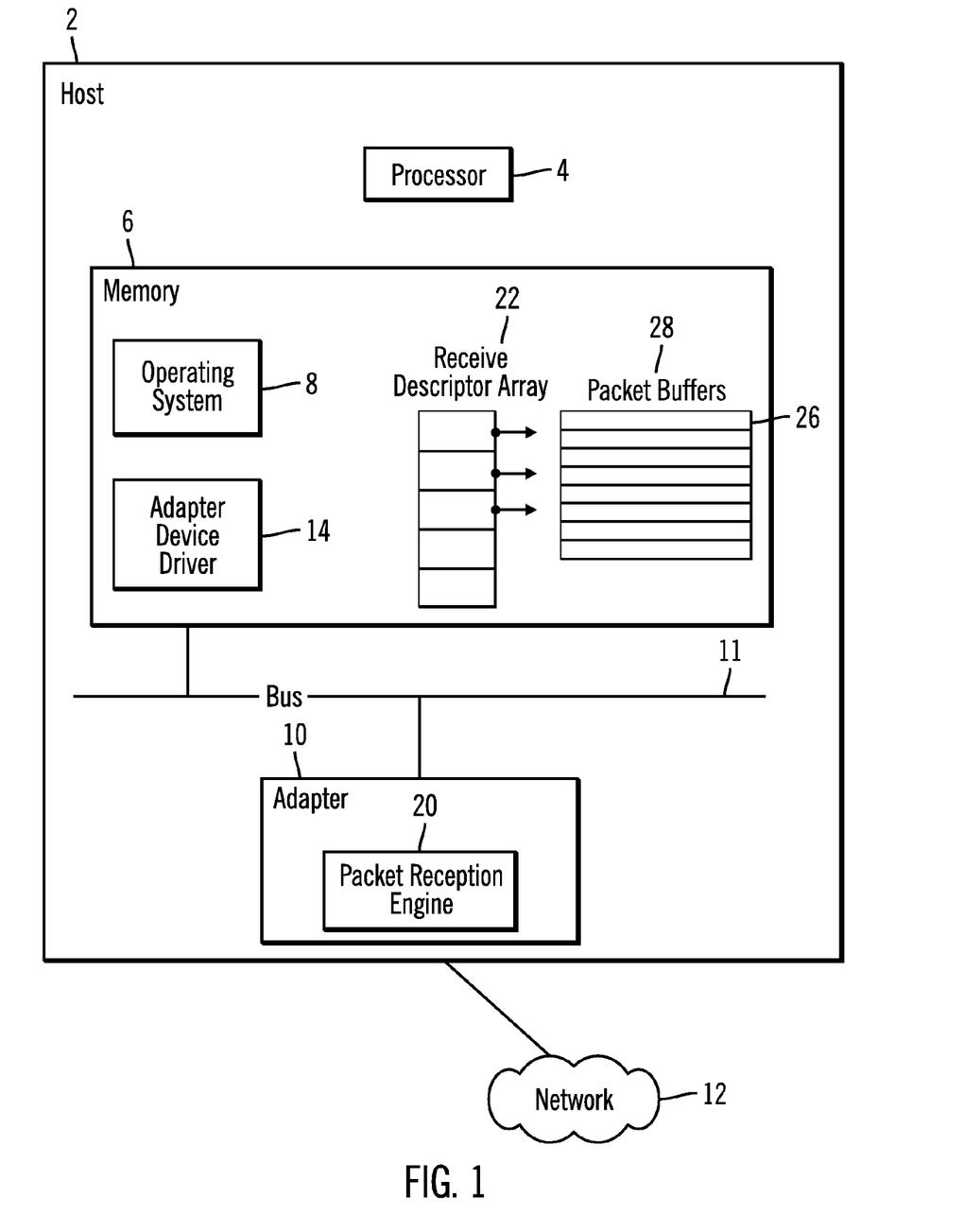
FIG. 1 illustrates a computing environment.

FIG. 1 illustrates a computing environment used with the described embodiments. A host system 2 has a processor 4, which may comprise one or more central processing units (CPU), a memory 6, an operating system 8, and is coupled to an adapter 10, such as a network interface card (NIC), to communicate over a network 12. The adapter 10 may be mounted on the host 2 motherboard, such as a Local Area Network (LAN) on Motherboard implementation, or be implemented in an expansion card that is inserted in a slot on the host 2 motherboard. An adapter device driver 14 executes in the memory 6 to provide an interface between the operating system 8 and the adapter 10 and performs such operations as managing interrupts, making device calls to control the adapter 10, and transmitting packets to the adapter 10. The adapter 10 and device driver 14 communicate over a bus interface 11, which may comprise bus interfaces known in the art, such as the Peripheral Component Interconnect (PCI) bus described in the publication "Conventional PCI 2.3", published by the PCI-SIG. There may be additional adapters in the host system.

The adapter 10 includes a packet reception engine 20 to process incoming packets. The packet reception engine 20 may implement network layer protocols, e.g., Ethernet, to process the received packets. Details of the Ethernet protocol are described in IEEE 802.3. In certain embodiments, certain of the TCP/IP protocol related operations may be offloaded into the packet reception engine 20 in the adapter 10. The adapter 10 further includes a network layer protocol for implementing the physical communication layer to send and receive network packets to and from remote devices over the network 12. Upon receiving network packets, the adapter 10 builds receive descriptor entries that are added to a receive descriptor array 22 accessible to both the adapter 10 hardware and the adapter driver 14 software executing in the host 2. The adapter 10 may include a Direct Memory Access (DMA) engine to build and update descriptors and transmit data to host memory 6. After creating receive descriptor entries, the adapter 10 may DMA the data (packet) it received from the network into a packet buffer, e.g., 26, in the packet buffer 28 area of the host memory 6 at the buffer address. The descriptor entries in the descriptor array 22 indicates to the adapter 10 hardware where to DMA the data and indicates to the adapter device driver 14 where to access the packet to return to a protocol driver, such as a TCP/IP protocol driver for processing the coded packets. In certain embodiments, each packet buffer, e.g., 26, may comprise a memory page which may include multiple packets.

Figure 2:
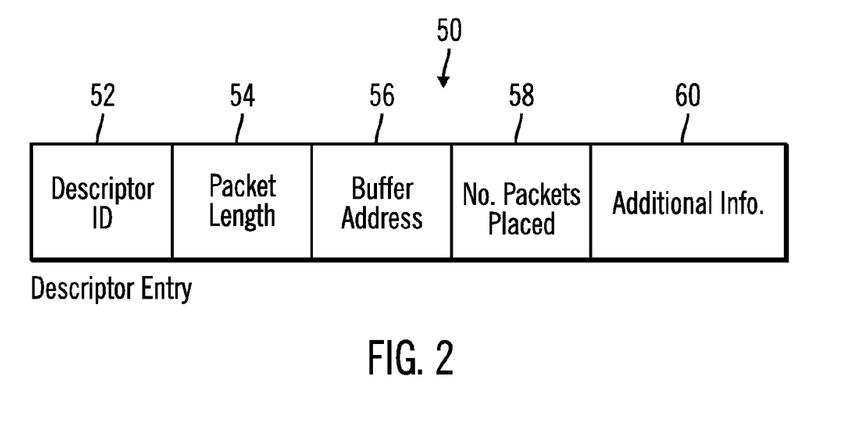
FIG. 2 illustrates descriptor information.

FIG. 2 illustrates information included in a descriptor entry 50 included in the receive descriptor array 22. In certain embodiments, each descriptor entry 50 is associated with one packet. The descriptor entry 50 includes a descriptor identifier 52 providing an identifier of the descriptor, a packet length 54 indicating the length of the packet, a buffer address 56 providing the physical address of the start of the buffer, e.g., 26, and a number of packets placed 58 indicating the number of packets contiguously stored in the buffer 26 referenced by the descriptor entry 50. In certain embodiments, the descriptor entry 50 referencing the first packet in the buffer, e.g., 26, includes the buffer address indicating the start of the buffer, but the descriptor entries for all subsequent packets in that buffer may not include the buffer address. In certain embodiments, the descriptor entries for the subsequent packets in a buffer may indicate the descriptor of the first packet or the buffer address in which they are included. In still alternative embodiments, the descriptors referencing the subsequent packets following the first packets in a packet buffer, e.g., 26, may be determined as the descriptor entries following the descriptor entry referencing the first packet. The number of descriptor entries referencing subsequent packets following the first packet that are in the buffer 26 are determined from the number of packets in the packet buffers 28. The descriptor entry 50 may include additional information 60, such as the status of the adapter 10 DMA operation to transfer the packets from the adapter 10 to the packet buffer 26, the IP checksum status, etc.

Figure 3:
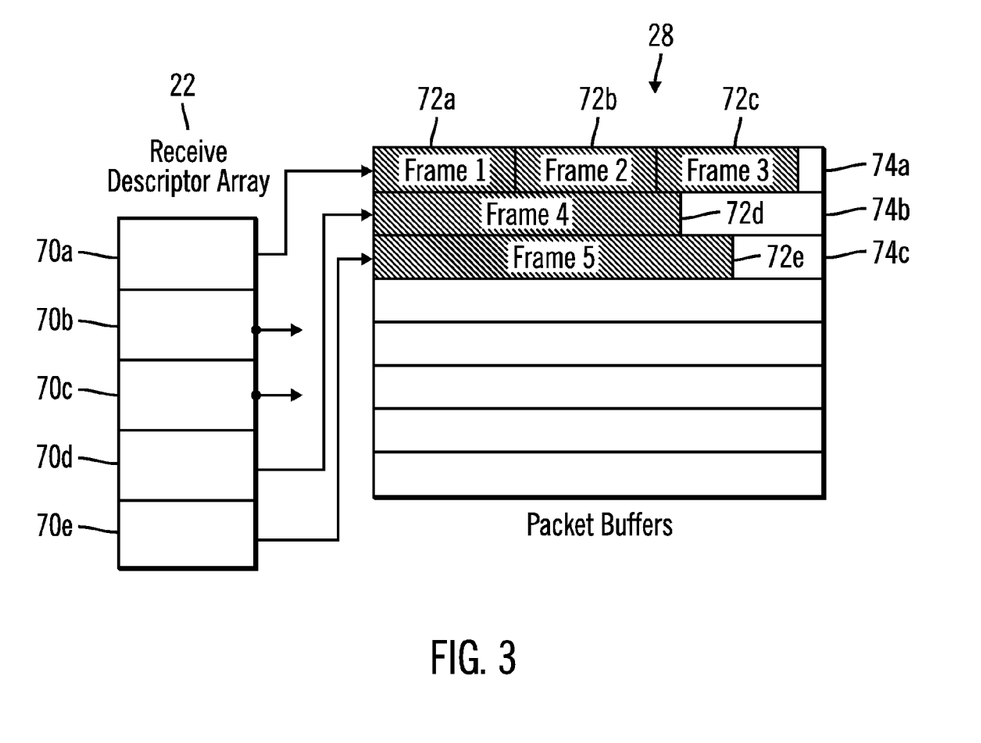
FIG. 3 illustrates how descriptor array entries reference buffers including packets.

FIG. 3 illustrates an example of how entries in the descriptor array 22 may reference packets in packet buffers

28. For instance, descriptor 70a references a first packet 72a in packet buffer 74a. Descriptors 70b and 70c reference the subsequent packet frames 72b and 72c in packet buffer 74a. Descriptor 70d references packet frame 72d in buffer 74b and descriptor 70e references packet frame 72e in buffer 74c.

Figure 4:
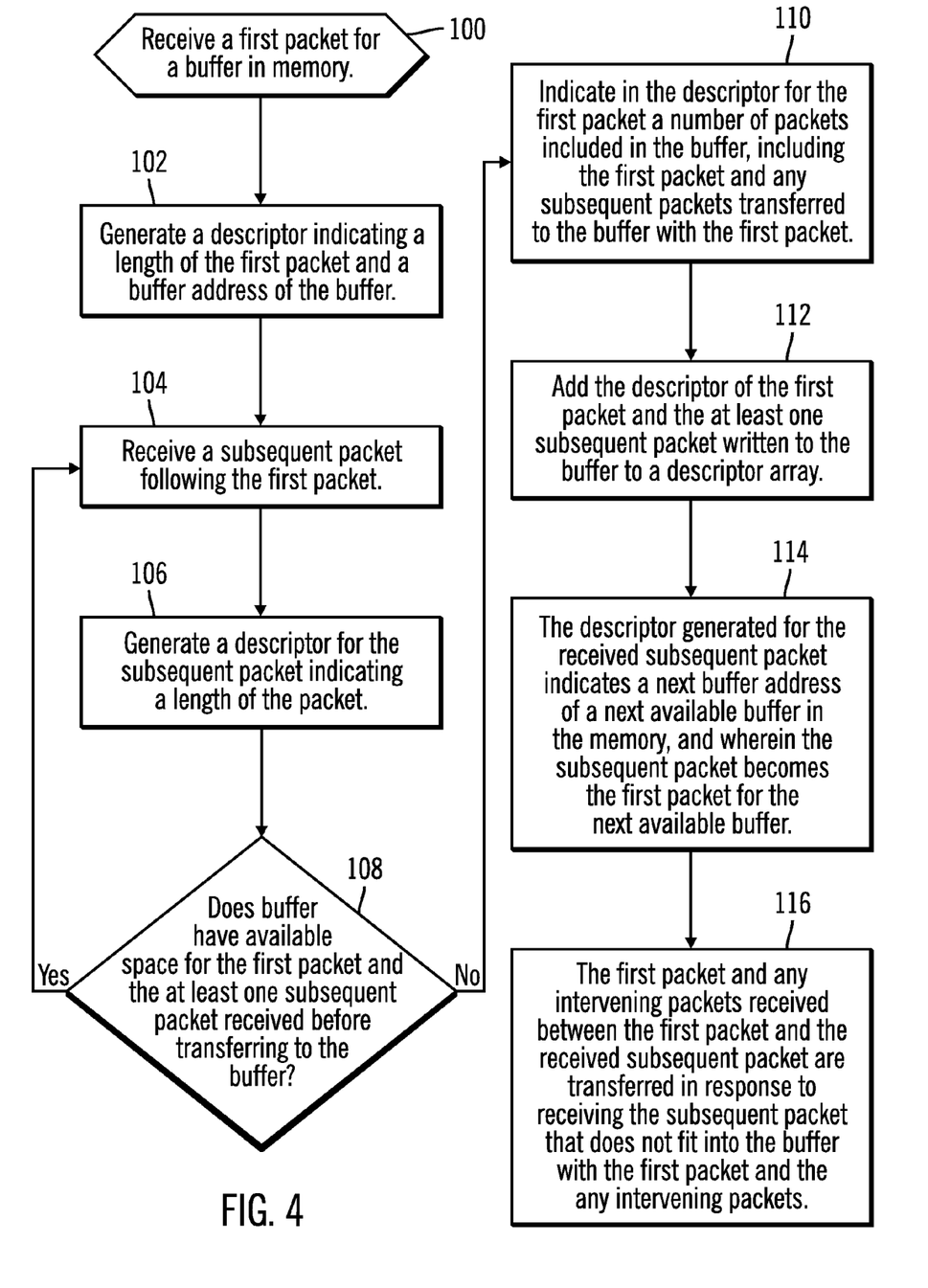
FIG. 4 illustrates operations to transfer packets to host memory buffers.

FIG. 4 illustrates operations performed by the packet reception engine 20 to store packets in the packet buffers 28 (FIG. 1). A first packet is received (at block 100) for a buffer, e.g., 26, in memory 6. A descriptor 50 is generated (at block 102) indicating a length of the first packet and a buffer address of the buffer. The length of the packet may be indicated in the packet length field 54 and the buffer address indicated in field 56. Upon receiving a subsequent packet (at block 104), the packet reception engine 20 generates (at block 106) a descriptor 50 for the subsequent packet indicating a length of the packet, such as in the packet length 54 field of the new descriptor. If (at block 108) the current buffer 26 being used has available space for the first packet and the at least one subsequent packet received before transferring the packets to the buffer, then control returns to block 104 to receive a further packet. Thus, in certain embodiments, the packet reception engine 20 delays writing a group of received one or more packets if the packets received so far can fit into the currently used buffer 26 with space to spare for any further packets. In this way, all the packets that are intended to fit into one packet buffer 26 may be transferred to the host memory 6 in a single bus 11 transaction. In alternative embodiments, the adapter 10 may send the packets for a single buffer in multiple bus transactions.

If (at block 108) there is no available space in the current buffer 26 for the recently received packet and previously received packets not yet transferred, then operations are performed to transfer to the buffer the first packet and any intervening packets between the first packet and recently received subsequent packets. In alternative embodiments, the packets may be transferred if the available space is less than a minimum possible packet size, which may include the size of headers. If there is not sufficient space, then indication is made (at block 110) in the descriptor 50 for the first packet of a number of packets 50 that will be transferred to the buffer 26, including the first packet and any subsequent packets transferred to the buffer with the first packet, which may not include the recently received subsequent packet. The descriptors 50 for the first packet and the at least one subsequent packet written to the buffer with the first descriptor are written (at block 112) to the descriptor array 22.

Further, the descriptor the packet reception engine 20 generates (at block 114) for the received subsequent packet indicates a next buffer address of a next available buffer in the memory 6, e.g., 74b (FIG. 3). In such case, the subsequent packet, e.g., 72d, becomes the first packet for the next available buffer, e.g., 74b. The first packet and any intervening packets received between the first packet and the received subsequent packet, e.g., 72a, 72b, 72c, are transferred (at block 116) in response to receiving the subsequent packet that does not fit into the buffer with the first packet and the any intervening packets. In certain embodiments, the first packet and each subsequent packet is transmitted on a bus 11 into the buffer 26 in a single bus transaction to the buffer.

Figure 5:
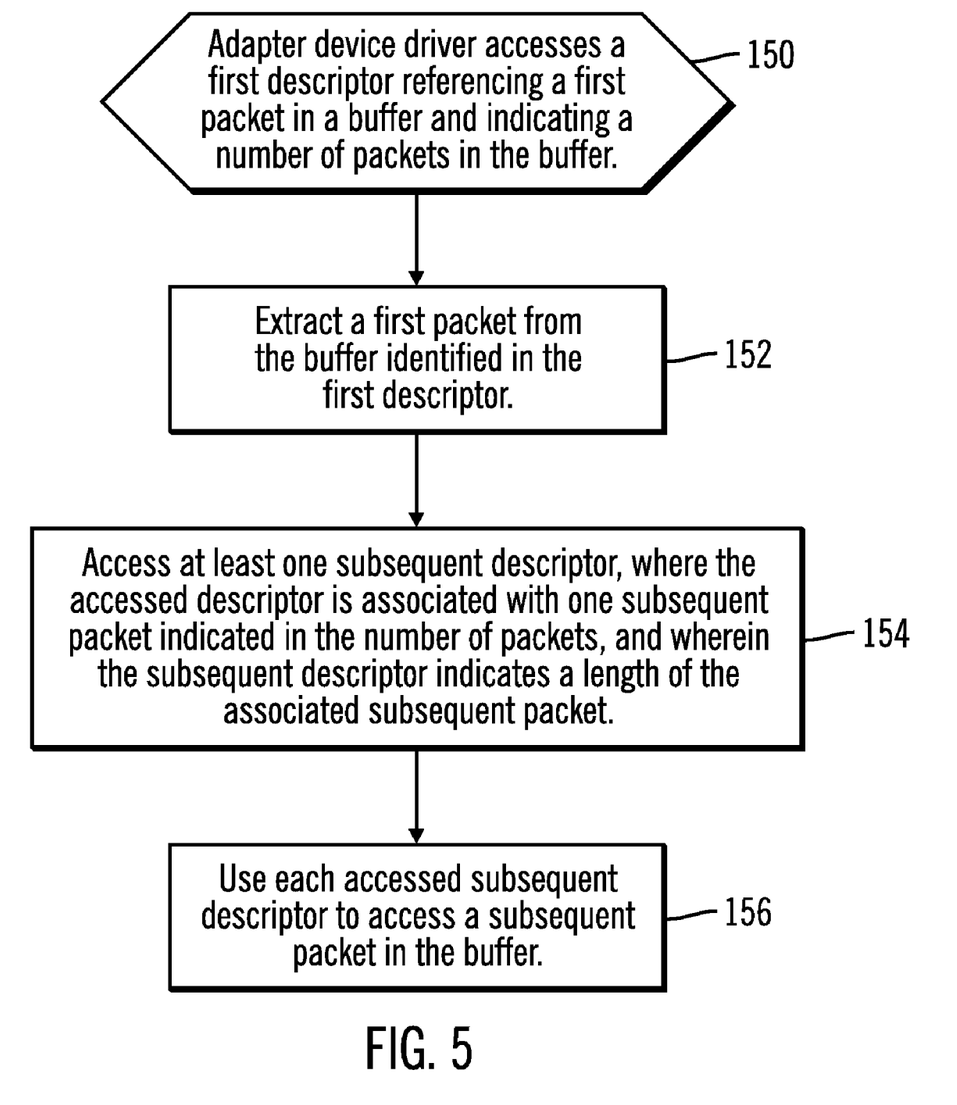
FIG. 5 illustrates operations performed by the adapter device driver to access packets in the host memory.

FIG. 5 illustrates operations performed by the adapter device driver 14 to use the receive descriptor array 22 to process packets placed in the packet buffer 28 by the packet reception engine 20. In certain embodiments, the packet reception engine 20 signals the adapter device driver 14 to process packets in the packet buffers 28 after transferring the packets to the packet buffers 28. At block 150, the adapter device driver 14 accesses a first descriptor 50 referencing a first packet, e.g., 72a (FIG. 3), in a buffer, e.g., 74a, and indicating a number of packets in the buffer, such as in field 58 (FIG. 2). A first packet, e.g., 72a, is extracted (at block 152) from the buffer, e.g., 74a, identified in the first descriptor, such as in buffer address field 56. At block 154, at least one subsequent descriptor, e.g., 70b, 70c, 70d, 70e (FIG. 3), in the descriptor array 22 is accessed. The accessed descriptor is associated with one subsequent packet indicated in the number of packets and the subsequent descriptor indicates a length of the associated subsequent packet. Each accessed subsequent descriptor is used (at block 156) to access the associated subsequent packet, e.g., 72b, 72c, in the buffer, e.g., 74a. The descriptors, e.g., 70a, 70b, 70c, are released after extracting the packets, e.g., 72a, 72b, 72c associated with the descriptors.

By allowing multiple packets to share a memory buffer, described embodiments optimize packet processing for small packets. Certain embodiments, such as streaming media or voice over Internet Protocol (IP) transfer relatively small sized packets, such as between 64 to 128 bytes. The described embodiments allow multiple of such smaller packets to be stored in a single memory buffer, which may comprise the maximum transfer unit for Ethernet, e.g., 1514 bytes, to optimize space utilization of the packet buffers. Further, in embodiments where all packets for a memory buffer are transferred in a same bus transaction, bus overhead is conserved because the overhead per transaction is reduced by placing multiple packets into single bus transactions.

Further, placing multiple packets into a single memory buffer improves processor cache utilization. For instance, many processors use on-board cache, and load data into cache lines of the on-board cache, where each cache line may have space for 64 or 128 byte lines. With the described embodiments, if the content of a buffer is loaded into the processor cache, then the processor cache will comprise mostly packet data because, with the described embodiments, as much free space as possible in the buffer is utilized to store packets, minimizing the use of cache lines to store empty space in the buffers. Further, the number of cache hits is increased by including multiple packets into a single cache line to maximize the number of packets subject to cache requests in the packet buffer space. One additional reason for increased cached hits is cache-line prefetching: accessing cache-line triggers in an early fetch (pre-fetch) of cache-line X+1. Thus, if a number of small packets reside in consecutive cache-lines, packets will be ready in CPU cache when the processor performs data access operations.

Yet further, in embodiments where each buffer is implemented in a separate memory page, the overhead associated with accessing memory pages is minimized by including multiple packets in a single buffer/memory page. This reduces the number of different memory pages that are accessed in order to access multiple packets.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

FIG. 2 illustrates an example of information included in a descriptor. The descriptor information may be stored in a different format than shown in FIG. 2 with additional or less information on each connection between two devices and the information on the devices.

The described embodiments concern the transmittal of packets from a network adapter to host memory. However, the described embodiments for buffering packets may apply to packets received from Input/Output devices other than network adapters, such as a storage interface, printer interface, etc.

In described embodiments, packets were transmitted to a buffer after a point was reached that no further packets could fit into the buffer. In alternative embodiments, packets may be transmitted to a buffer even if the buffer has available free space for further packets. For instance, the packets may be transmitted to a single buffer if a timer has expired, where the timer is reset when starting a new buffer to receive packets. The adapter may also send the packets if the adapter does not want to bundle consecutive packets. The adapter may only bundle packets in a single buffer that are going to be processed by a same host processor, so that different buffers may have packets to be processed by different host processors.

The illustrated operations of FIGS. 4 and 5 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    receiving a first packet for a buffer in memory;
    generating a descriptor indicating a length of the first packet and a buffer address of the buffer;
    receiving at least one subsequent packet following the first packet;
    determining whether the buffer has available space to store the first packet and the at least one subsequent packet received before transferring the first and the at least one subsequent packet to the buffer;
    generating a descriptor for the at least one subsequent packet indicating the buffer in response to the determining that the buffer has available space;
    transferring to the buffer the first packet and the at least one subsequent packet capable of fitting into the buffer in response to the determining that the buffer has available space, wherein the descriptors for the first and the at least one subsequent packet indicate the same buffer while the first and the at least one subsequent packet are stored in the buffer; and
    adding the descriptors of the first packet and the at least one subsequent packet written to the buffer to a descriptor array.

2. The method of claim 1, wherein in response to receiving one of the at least one subsequent packets, further performing:
    waiting to receive one more subsequent packet before transferring the first packet and the received at least one subsequent packet capable of fitting into the buffer to the buffer if the buffer has available space.

3. The method of claim 1, wherein the buffer comprises a current buffer, wherein in response to receiving a most recently received packet following receiving the first packet and the at least one subsequent packet not yet transferred to the current buffer, further performing:
    determining whether the current buffer has available space for the first packet, the at least one subsequent packet, and the most recently received packet not yet transferred to the current buffer, wherein the first packet and the at least one subsequent packet determining that the current are transferred in response to determining that the current buffer does not have available space for the first packet, the at least one subsequent packet, and the most recently received not yet transferred to the current buffer and wherein the descriptor generated for the most recently received packet indicates a next buffer address of a next available buffer in the memory in response to determining that there is not enough available space in the current buffer for the first packet, the at least one subsequent packet, and the most recently received packet not yet transferred to the current buffer, and wherein the most recently received packet becomes the first packet for the next available buffer.

4. The method of claim 1, wherein the first and the at least one subsequent packets are transferred to the buffer in response to a timer expiring.

5. The method of claim 1, wherein all packets in the buffer are processed by one processor and wherein packets in different buffers are capable of being processed by different processors.

6. The method of claim 1, wherein the descriptor generated for each subsequent packet that is transferred to the buffer with the first packet indicates a length of the subsequent packet for which the descriptor was generated.

7. The method of claim 1, further comprising:
indicating in the descriptor for the first packet a number of packets included in the buffer, including the first packet and the at least one subsequent packet that are transferred to the buffer with the first packet.

8. The method of claim 1, wherein writing the first packet and the at least one subsequent packet comprises transmitting on a bus the first packet and the at least one subsequent packet capable of fitting into the buffer in a single bus transaction to the buffer.

9. The method of claim 1, wherein the buffer resides in a host memory, wherein an adapter coupled to the host performs receiving the packets, generating the descriptors, transferring the packets to the buffer, and adding the descriptors to a descriptor array.

10. A system, comprising:
a memory including a plurality of buffers;
an Input/Output (I/O) device interface in data communication with the memory and having circuitry enabled to:
receive a first packet for a buffer in the memory;
generate a descriptor indicating a length of the first packet and a buffer address of the buffer;
receive at least one subsequent packet following the first packet;
determine whether the buffer has available space to store the first packet and the at least one subsequent packet received before transferring the first and the at least one subsequent packet to the buffer;
generate a descriptor for the at least one subsequent packet indicating the buffer in response to the determining that the buffer has available space;
transfer to the buffer the first packet and the at least one subsequent packet capable of fitting into the buffer in response to the determining that the buffer has available space, wherein the descriptors for the first and the at least one subsequent packet indicate the same buffer while the first and the at least one subsequent packet are; and
add the descriptors of the first packet and the at least one subsequent packet written to the buffer to a descriptor array.

11. The system of claim 10, wherein in response to receiving one subsequent packet, the circuitry is further enabled to:
wait to receive at least one more subsequent packet before transferring the first packet and the received at least one subsequent packet capable of fitting into the buffer to the buffer if the buffer has available space.

12. The system of claim 10, wherein the buffer comprises a current buffer, wherein in response to receiving a most recently received packet following receiving the first packet and the at least one subsequent packet not yet transferred to the current buffer, wherein the circuitry is further enabled to:
determine whether the current buffer has available space for the first packet, the at least one subsequent packet, and the most recently received packet not yet transferred to the current buffer, wherein the first packet and the at least one subsequent packet are transferred in response to determining that the current buffer does not have available space for the first packet, the at least one subsequent packet, and the most recently received not yet transferred to the current buffer, and wherein the descriptor generated for the most recently received packet indicates a next buffer address of a next available buffer in the memory in response to determining that there is not enough available space in the current buffer for the first packet, at least one subsequent packet, and the most recently current buffer, and wherein the most recently received packet becomes the first packet for the next available buffer.

13. The system of claim 10, further comprising:
a timer, wherein the first packet and the at least one subsequent packet are transferred to the buffer in response to a timer expiring.

14. The system of claim 10, further comprising:
a plurality of processors, wherein all packets in the buffer are processed by one processor and wherein packets in different buffers are capable of being processed by different processors.

15. The system of claim 10, wherein the descriptor generated for each subsequent packet that is transferred into the buffer with the first packet indicates a length of the subsequent packet for which the descriptor was generated.

16. The system of claim 10, wherein the circuitry is further capable of performing:
indicating in the descriptor for the first packet a number of packets included in the buffer, including the first packet and the at least one subsequent packet that are transferred to the buffer with the first packet.

17. The system of claim 10, further comprising:
a bus interfacing the memory and the I/O device interface, wherein the circuitry writes the first packet and the at least one subsequent packet by transmitting on the bus the first packet and the at least one subsequent packet capable of fitting into the buffer in a single bus transaction to the buffer.

18. The system of claim 10, wherein the I/O device comprises a network adapter.

19. A system in communication with a network, comprising:
a memory including a plurality of buffers;
an adapter in data communication with the network and the memory and having circuitry enabled to:
receive a first packet for a buffer in the memory;
generate a descriptor indicating a length of the first packet and a buffer address of the buffer;
receive at least one subsequent packet following the first packet;
determine whether the buffer has available space to store the first packet and the at least one subsequent packet received before transferring the first and the at least one subsequent packet to the buffer;
generate a descriptor for the at least one subsequent packet indicating the buffer in response to the determining that the buffer has available space;
transfer to the buffer the first packet and the at least one subsequent packet capable of fitting into the buffer in response to the determining that the buffer has available space, wherein the descriptors for the first and the at least one subsequent packet indicate the same buffer while the first and the at least one subsequent packet are stored in the buffer; and
add the descriptors of the first packet and the at least one subsequent packet written to the buffer to a descriptor array.

20. The system of claim 19, wherein in response to receiving one of the at least one subsequent packet, the circuitry is further enabled to:
  wait to receive at least one more subsequent packet before transferring the first packet and the received at least one subsequent packet capable of fitting into the buffer to the buffer if the buffer has available space.

21. An article of manufacture comprising at least one of a hardware device having hardware logic and a computer readable storage medium having computer executable code enabled to cause operations to:
  receive a first packet for a buffer in memory;
  generate a descriptor indicating a length of the first packet and a buffer address of the buffer;
  receive at least one subsequent packet following the first packet
  determine whether the buffer has available space to store the first packet and the at least one subsequent packet received before transferring the first and the at least one subsequent packet to the buffer;
  generate a descriptor for the at least one subsequent packet indicating the buffer in response to the determining that the buffer has available space;
  transfer to the buffer the first packet and the at least one subsequent packet capable of fitting into the buffer in response to the determining that the buffer has available space, wherein the descriptors for the first and the at least one subsequent packet indicate the same buffer while the first and the at least one subsequent packet are stored in the buffer; and
  add the descriptors of the first packet and the at least one subsequent packet written to the buffer to a descriptor array.

22. The article of manufacture of claim 21, wherein the operations further comprise in response to receiving one of the at least one subsequent packet:
  wait to receive one more subsequent packet before transferring the first packet and the received at least one subsequent packet capable of fitting into the buffer to the buffer if the buffer has available space.

23. The article of manufacture of claim 21, wherein the buffer comprises a current buffer, wherein the operations further comprise in response to receiving a most recently received packet following receiving the first packet and the at least one subsequent packet not yet transferred to the current buffer:
  determine whether the buffer has available space for the first packet, the at least one subsequent packet, and the most recently received packet not yet transferred to the current buffer, wherein the first packet and the at least one subsequent packet are transferred in response to determining that the current buffer does not have available space for the first packet, the at least one subsequent packet, and the most recently received not yet transferred to the current buffer, and wherein the descriptor generated for the most recently received packet indicates a next buffer address of a next available buffer in the memory in response to determining that there is not enough available space in the buffer for the first packet, the at least one subsequent packet, and the most recently received not yet tranferred to the current buffer, and wherein the most recently received packet becomes the first packet for the next available buffer.

24. The article of manufacture of claim 21, wherein the first packet and at least one subsequent packet are transferred to the buffer in response to a timer expiring.

25. The article of manufacture of claim 21, wherein all packets in the buffer are processed by one processor and wherein packets in different buffers are capable of being processed by different processors.

26. The article of manufacture of claim 21, wherein the descriptor generated for each subsequent packet that is transferred to the buffer with the first packet indicates a length of the subsequent packet for which the descriptor was generated.

27. The article of manufacture of claim 21, wherein the operations further comprise:
  indicate in the descriptor for the first packet a number of packets included in the buffer, including the first packet and the at least one subsequent packet that are transferred to the buffer with the first packet.

28. The article of manufacture of claim 21, wherein writing the first packet and the at least one subsequent packet comprises transmitting on a bus the first packet and the at least one subsequent packet capable of fitting into the buffer in a single bus transaction to the buffer.

29. The article of manufacture of claim 21, wherein the buffer resides in a host memory, wherein an adapter coupled to the host performs receiving the packets, generating the descriptors, transferring the packets to the buffer, and adding the descriptors to a descriptor array.

* * * * *

UNITED STATES PATENT AND TRADEMARK OFFICE
CERTIFICATE OF CORRECTION

PATENT NO. : 7,284,075 B2  Page 1 of 1
APPLICATION NO. : 10/806507
DATED : October 16, 2007
INVENTOR(S) : Avigdor Eldar et al.

It is certified that error appears in the above-identified patent and that said Letters Patent is hereby corrected as shown below:

Column 6, Line 50-51, delete "determining that the current" after "subsequent packet".

Column 6, Line 55, insert --,-- after "buffer".

Column 8, Line 9, delete "packet, at" and replace with --packet and the at--.

Column 8, Line 10, delete "packet, and the most recently" and replace with --packet including the most recently--.

Column 8, Line 10, insert --received not yet transferred to the-- after "most recently".

Column 10, Line 6, delete "received not" and replace with --received packet not--.

Signed and Sealed this

Twelfth Day of October, 2010

David J. Kappos
*Director of the United States Patent and Trademark Office*